Nov. 22, 1960     L. W. PARKER     2,961,570
MULTIPLE READING INSTRUMENTS
Filed Oct. 24, 1952

INVENTOR
LOUIS W. PARKER
BY Moore & Hall
ATTORNEYS

United States Patent Office 2,961,570
Patented Nov. 22, 1960

2,961,570

MULTIPLE READING INSTRUMENTS

Louis W. Parker, 28 Polo Road, Great Neck, N.Y.

Filed Oct. 24, 1952, Ser. No. 316,735

9 Claims. (Cl. 315—1)

This invention relates to electrical instruments of the type employing a cathode ray tube for indicator and more particularly to such instruments where a multiplicity of indications are obtained simultaneusly on the cathode ray tube.

This present application is the continuation in part of my previous application entitled "Multiple Reading Instrument," U.S. Serial No. 276,211, filed March 12, 1952, now abandoned.

It is necessary sometimes for the operator of a complex mechanism to watch almost simultaneously a large number of instruments. Such is the case for example of an airplane pilot who is faced with watching as many as twenty or more instruments at the same time while also piloting and controlling the aircraft. Such work places a great strain on the operator which it is an object of this invention to overcome.

The fundamental purpose of the invention is to present to the view of the operator a line or a geometric figure such as for instance a circle, on a cathode ray tube and to control small portions of this figure or line by the various instruments or voltages which are to be read. If the figure used is a circle, these instruments or voltages may alter small arcs on it in any suitable manner as, for example, by increasing or decreasing their radius. The equipment is so adjusted initially that under normal operation all arcs have approximately the same radius and they combine to make a fairly regular circle. As soon as one of the instruments or voltages departs from its optimum reading, the arc corresponding to that instrument moves closer or further from the center of the viewing screen and so distorts the circle. Even a small distortion is immediately noticed. Also, if several instruments cause various distortions the extent of deviation is noticed but only with limited accuracy. If greater accuracy is desired, the operator may look at the conventional instrument corresponding to its respective portion of the circle.

In this way, the operator watches the figure on the cathode ray tube instead of twenty or more instruments on the board and only in exceptional cases need look at the instrument panel. The size of the figure on the cathode ray tube is such that the operator, sitting at a comfortable reading distance, can see all of it simultaneously without moving his eyes.

Another object of the invention is to have some or all of the arcs on the circle activated by other means than meters. Any variation that can be made to be represented by electric potential variations may be shown on the circle. For example, the charging or discharging of a battery can be represented as a low D.C. potential across a resistance in series with the battery. This can be amplified to deflect the beam and be read over a scale. Thus, the usual ammeter can be completely replaced by the cathode ray tube, or the two different methods of measurement may be retained so that if one fails the other can still be used.

In many cases it is conventional to transform into electrical effects the different phenomena required to be measured. For instance, speed of an engine is measured by the voltage generated in a small generator driven by the engine, the float in the fuel tank rotates electric potentiometers etc. In these case the electricity used for measurement at present, may also be used directly or after amplification to operate the multiple reading cathode ray instrument which is the subject of this invention.

Still another purpose of the invention is to emphasize and deemphasize meter readings according to their importance. By way of explanation of this, it may be stated that some readings are critical to the operation of the aircraft or mechanism. In other words, small changes in the reading mean comparatively great changes in operation. In other instances the readings may vary greatly without much effect. It is one of the purposes of the invention to vary the circle viewed by the operator in proportion to the importance of the reading. Expressed in another way, the range and deviation from linearity of the readings on the cathode ray tube are so adjusted that important variations cause greater distortion of the circle than less important variations.

Still another purpose is to enable the operator watching the cathode ray tube to read in absolute values the various currents, voltages, pressures, etc. directly from the face of the tube and in this way to eliminate the need for a large number of separate instruments. To accomplish this, each arc is operating over a calibrated scale. The scale of course is crowded or spread to correspond with the aforementioned purpose of emphasizing or deemphasizing certain readings or when the reading is near a certain operating point. As an example, the fuel gauge on an airplane need not be read every few minutes accurately, but when the supply is below a predetermined amount, say ¼ of full, any further drop increases in importance in practically inverse proportion to the amount remaining in the tank. In this case the arc corresponding to the fuel gauge would have the "Full," ¾, ½ and ¼ close together, but below the ¼ there would be 0.2, 0.15, 0.1 etc. readings increasingly far apart in order to call attention to a dangerous condition and to give more accurate readings when such conditions exist. This crowding and spreading of the scale may be accomplished many different ways, for example with the use of a nonlinear potentiometer operated by the float in the fuel tank.

A still further object of the present invention is to provide means for televising the multiple indications shown on the screen of the cathode ray tube, while at the same time a pilot may be watching these indications directly and at any such light intensity level as suits his vision.

Additional purposes of the invention will be apparent from the following more detailed description, the invention being shown diagrammatically in the accompanying drawing forming a part of the specification, it being understood that the drawing is for the purpose of illustration only and that various changes may be made or alternatives used which do not depart from the spirit of the invention as defined in the appended claims.

In the drawings,

Fig. 1 diagrammatically illustrates the operation of an oil pressure gauge used for changing its mechanical indications into electrical potential variations.

Figure 1:
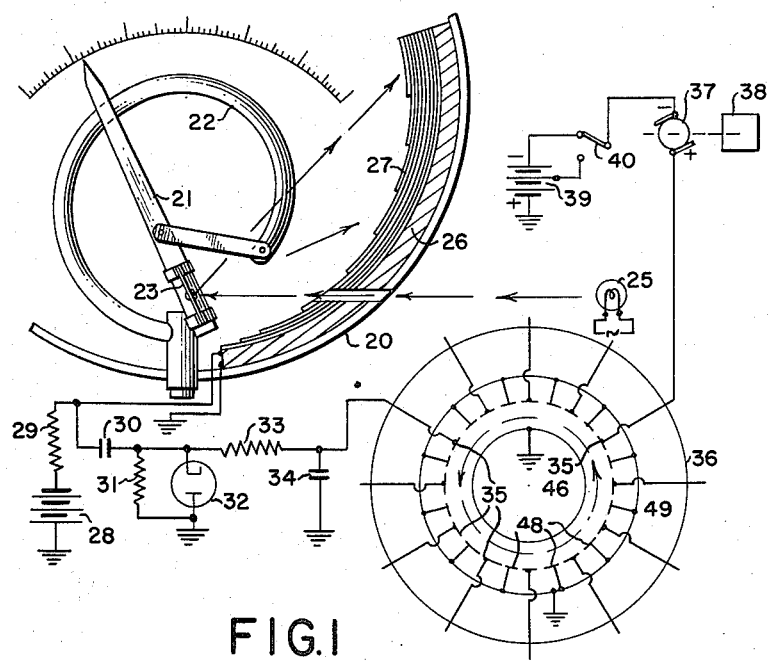

On Fig. 1 the numeral 20 indicates a pressure gauge shown in part for the purpose of illustrating the principle of one portion of the invention. This instrument 20 is provided with Bourdon tube 22 linked to a pointer needle 21 in the customary manner, except that a small sheet of metal 23 is attached to the pointer needle above its fulcrum. This sheet of metal 23 is mirror finished and its shiny surface is parallel to the axis of rotation of pointer 21. In this way the mirror surface reflects a beam of light coming into the instrument from a light source 25. As the pointer turns, the mirror 23 turns with it and the reflected light beam, indicated by broken lines, rotates around a circular path. Interposed in the rotating beam is a selenium light cell 26 so located, that as the beam rotates it illuminates a small portion of the cell, first on top, with respect to Fig. 1, then progressively lower. The intensity of illumination is made to vary over the light cell as the beam progresses, by interposing various thicknesses of filters as shown at 27. The number of these filters may be more or less than shown on Fig. 1 depending on the gradations of reading required. By varying the degree of opacity of these filters from one end of the light cell 26 to the other, it is possible to obtain any desired crowding or spreading of the scale on the cathode ray tube screen. In spite of the filters appearing to change the light intensity in steps, the fact is that if the length of the spot of light equals the distance from the end of one filter to the next, the change of cell resistance due to varying illumination will not be in steps, since the spot gradually moves off one region and into the other.

It is of course possible to make one sheet of filter gradually less transparent from one end to the other by various other means, for example, by spraying more paint on the less transparent end. It is also possible to make the selenium cell more sensitive on one end than the other by known methods, such as varying the space between conductors. The various methods used are not the subject of the instant invention, only the application of such light cell with or without filter and having more sensitivity on one end than the other. The cell itself in most cases can be small enough to be touched by the light beam only near the middle of the instrument scale. When the needle 21 is deflected far from the middle there is an indication of danger on the cathode ray tube.

Battery 28 passes a small amount of electricity through cell 26 and high resistance 29. The useful voltage variation appears across this resistance 29. While in some cases this is all that is required, I prefer at most times to use a modulated light source and use only the A.C. component across resistance 29. A simple way to accomplish this is by using a low frequency alternating current, such as 10 cycles per second, to heat a thin filament in light source 25 although any other known method of light modulation may be used. The purpose of using a modulated light source is to differentiate it from ambient illumination.

The A.C. component across resistance 29 is not of sine wave form due to the light intensity variation following an exponential law and its peaks are rectified into direct current by the elements 30, 31 and 32 in a conventional manner. This rectified D.C. potential may be further filtered by elements 33 and 34 and then applied to a special deflection plate 35 in the cathode ray tube 36. The polarity of this direct current determines whether the arc on the face of the cathode ray tube moves towards or away from the center of the viewing screen when the needle 21 moves clockwise. This can be changed at will by reversing diode 32 or filter 27.

There is also another form of signal shown on Fig. 1 to operate the cathode ray tube. It is a conventional tachometer 37 attached to engine 38, the latter being represented in block form. This device is a small electric generator the voltage of which is proportional to the engine revolutions per minute. This voltage may be applied directly to a deflection plate 35 in the cathode ray tube, except that in order to get more accurate readings near the normal cruising speed there is a biasing battery 39 in series to counteract the deflecting potential until at high speed the generator voltage predominates. To make readings at low speeds, range switch 40 may disconnect all or part of the battery 39 and the speed may be read on another scale.

As hereinabove stated, there are many other cases when instrument 20 is not necessary for the application of the invention, the above mentioned use of the tachometer is only quoted to serve as an example.

Figure 2:
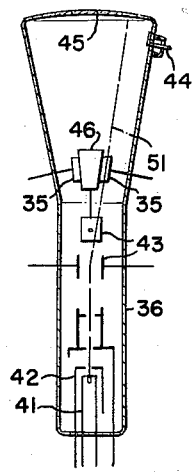
Fig. 2 shows the elements of a cathode ray tube used in the invention.

The general constructional features of the cathode ray tube used as the indicating device of this invention are shown on Fig. 2. With the exception of additional deflection plates 35, it is similar to conventional tubes of the type used in cathode ray oscilloscopes. That is to say, its main parts are a cathode 41, an electron lens 42, four deflection plates 43, a second anode 44, and a fluorescent screen 45, all mounted in the evacuated envelope 36. In addition to these conventional parts, there are a plurality of the deflection plates 35 located in a circle concentric with the axis of tube 36 and shown in greater detail, diagrammatically, in Fig. 1. Of course if the figure used on the cathode ray tube is not a circle, plates 35 are located around the particular shape of figure used. These plates are located between the four conventional plates 43 and the viewing screen. The conventional plates 43 are connected to a source of two phase alternating current of any frequency and in the well-known manner they cause the end of the electron beam, indicated by a broken line 51, Fig. 3, to form a circle on the viewing screen 45 when the tube is energized by a suitable power supply. Before the beam 51 can reach the viewing screen, however, it passes through the circle of the additional plates 35. If there is any potential between these plates 35, the path of the beam is altered and consequently there is a change in the circle on the face of the tube. To simplify explanation I prefer to call all these second set of deflection plates 35, secondary deflection plates. For purposes of illustration, let us assume that there are twenty-four secondary deflection plates arranged in the circle and an axially disposed truncated shell 46 within the circle of plates as shown. The voltages on the tube are so adjusted that the rotating electron beam 51 passes between these plates 35 and the conical shell 46. The second anode 44 of the tube is grounded as is customary in cathode ray oscilloscopes and cone member 46 is also grounded. Of the twenty-four secondary deflection plates, twelve, indicated at 48, are only about ¼ as wide as the other twelve plates, 35, with a narrow spacing between all plates. The wider plates 35 are conducted outside the tube in order to receive various deflecting potentials. The narrower plates 48 have a common connection 49 and this connection is grounded as shown on Fig. 1.

Figures 3, 4:
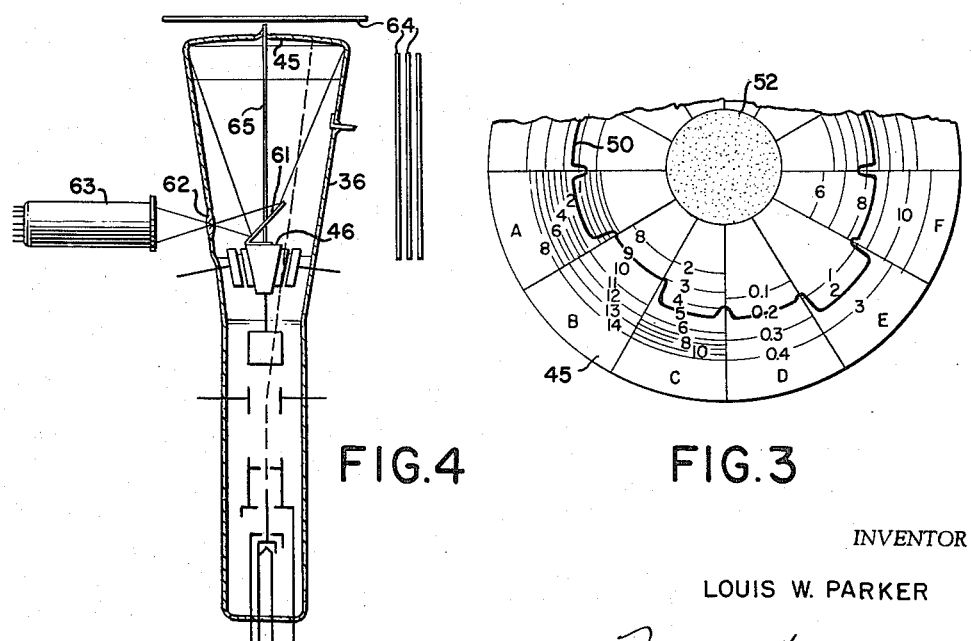
Fig. 3 is an illustration of the circle seen by the operator using the invention.
Fig. 4 shows a cathode ray tube used for both direct viewing and telemetering the image created on its screen.

When the equipment is turned on, but before voltage is applied to secondary plates 35, there will be a circle shown on the viewing screen as partly illustrated at 50, Fig. 3. This circle may be of small diameter, say one inch on a five inch viewing screen. After proper voltages are applied to plates 35 the circle 50 increases to one of approximately three inches in diameter. In addition the circle will have twelve indentations, seven of which are illustrated on Fig. 3. These indentations are due to the twelve narrow plates 48 which are grounded. While these grounded plates 48 are not absolutely necessary, they help in localizing the electric field of each of the plates 35, making the displacement of the corresponding arcs independent of each other.

On Fig. 3 it is assumed that the instruments connected to all wider segments 35 are operating correctly except "B" which reads too low and "E" which is too high. These show the corresponding displacement.

The actual number of instruments connected to the cathode ray tube may be very high. For example, the circumference of a three and one quarter inch diameter circle (as may be used on a five inch tube) is about ten inches. If twenty instruments are used, each arc may be about ⅜ of an inch long and the indentations ⅛ inch. This is easily visible and even a greater number of instruments may be used.

The calibration scale on the face of the cathode ray tube may take any shape as, for example, that shown in Fig. 3. The numbers on the scale are illuminated by the arc of the circle 50 under it. In this way the unimportant numbers, those not near the luminous line, are not as visible as those which are to be read at a given moment. The scales shown on Fig. 3 may be on a separate transparent sheet mounted to the face of the tube, or may be etched on the glass. The first method is less expensive for mass production, but the separate scale may move the cause errors. The scales may also be printed on the inside of the screen to eliminate parallax and for additional reasons described later.

There is also an opaque disc 52 shown on Fig. 3 located concentrically on the screen. The purpose of this is to eliminate the arc completely when the indication is "off scale," that is when the radius of the arc is smaller than a predetermined amount. When the radius is too large, the beam moves off the face of the tube and so it also becomes invisible. This feature of eliminating the indication, when that reaches extreme proportions, helps to call attention to whatever defect causes such indication, therefore its use is advantageous. In some cases however it is necessary to know if the beam has disappeared due to too low or too high indication. In these cases the portion of disc 52 corresponding to that particular indication must be cut out.

In addition to the above described uses of the invention, one of its features is its easy application to telemetering. It is comparatively simple to project the light image created on the face of the cathode ray tube onto a small television pickup tube like a vidicon and transmit the resulting video frequencies by any conventional means to a remote place, where the picture can again be reproduced on a picture reproducing tube equiped with a similar scale as shown on Fig. 3. In this way a large number of meter readings are telemetered all together.

Such method is satisfactory when no provision is needed to observe directly the oscillogram on the face of the original cathode ray tube. However, if the problem is to see the tube at a remote location while another observer, for example the pilot of an airplane is also watching it directly, the above simple method has several drawbacks. One of these is the fact that ambient illumination may vary greatly and if the oscillogram is too brilliant it may affect the sensitivity of the observers eyes, especially at night. Yet high brilliancy is necessary for the television pick up tube. Another drawback is the considerable space required, which in the cockpit of a plane may be very scarce. This is due to the fact that both the pilot's eyes and the pick up tube must be somewhere near the axis of the cathode ray tube for best viewing. For these reasons the method of light pick up illustrated on Fig. 4 is preferred. On this figure mirror 61 is located inside cathode ray tube 36 in such manner as to show the inside of the screen 45, while viewed from a given point outside the tube. Inasmuch as cone 46 creates a blank region for the electron stream, locating mirror 61 in this space does not affect the operation of the tube. In this respect the method is novel, since no conventional cathode ray tube has such blank space near its axis and the above method could not be used in such tubes. Bar 65 supports cone 46 and it is also located in the blank region.

Provision is made to permit the light to pass through the side of cathode ray tube 36 undistorted. This may consist of a flat portion of glass welded into the wall or just simply a clearance of obstructions, such as coating material and permitting the very slight distortion caused by the curvature of the glass wall to remain. If space is very impotrant, a lens may be welded into the wall as shown at 62. This lens may project the picture directly or through another lens onto pick up tube 63. The edge of the lens is made inaccurate by welding but the effect of this can be eliminated by simply painting the edges black and using only the middle portion of the lens.

To reduce the brilliancy of the oscillogram on the screen of cathode ray tube 36, the pilot may pull over it any of several filters 64 of varying transparency and color. These are normally located in a space provided for them close to tube 36 and by a simple mechanical arrangement one or more of them may be placed over the screen of the cathode ray tube. By using this method to reduce the brilliancy, there is no disturbing effect on the television pick up tube 63, which always receives the maximum brilliancy from the inner side of the fluorescent screen 45.

One difficulty may be encountered in picking up and reproducing again the image on the cathode ray tube. In order to place the reproduced image on a screen having meter calibrations on it, it is necessary to have a highly accurate picture. Normally the linearity of the deflection systems is not very high and it may vary from time to time. For this reason if high degree of accuracy is required, it is preferable to transmit the scale of the instrument along with the indication. This may be done in a number of ways, one of which is to print short indexing lines on the inside of the screen 45. This can be accomplished with a rubber stamp, the protruding parts of which are covered with some material like aquadag. The color of aquadag is almost black and it can be seen from both sides of the screen 45. Looking at it from the outside, it has the advantage of indicating without parallax, while from the inside, it shows up visibly on portions near the oscillogram. The indexing lines must be made short and rather thin, otherwise too much of the oscillogram would be covered. Every second or fifth line must look different from the others in order to facilitate reading of the scale. The numbers corresponding to the scales need not be printed on the inside of the screen since the exact position of these is not important. These numbers need not be transmitted for the same reason.

The main purpose of televised indications is usually to enable a more thorough testing of aircraft in flight, by personnel located on the ground. A great advantage of the television type of telemetering is that regardless of what defect occurs in the television system, it can not show false indications, also it can't be jammed to give false indication. These facts can be especially important when the invention is used in guided missiles, since there is no one to check false readings inside the missile.

The invention is especially adaptable to the type of guided missiles where a television pick up equipment is enclosed within the missile to send back a picture of the ground viewed from the missile. In such cases, the camera picking up multiple meter readings is made to operate in synchrony with the ground viewing camera. By appropriate control impulses, the operator can rapidly switch the television transmitter within the missile to transmit from either camera or both cameras simultaneously, and in this way to watch the ground or the performance of the machinery within the missile. Nearly all the equipment to accomplish this is already present in the television type of guided missiles; all that need be added is the invention described in the foregoing specification.

I am aware of the fact that telemetering by televising the image of the indicating instrument is not new in the art. The novelty of my system however is in telemetering a great number of meter readings simultaneously and in some cases by making use of television equipment installed for a different purpose. Another novelty is that the operator can read all the meters at one glance and that his attention is directed away from normal readings which simply compose a circle, while abnormal readings draw his attention by the abnormality of the usually regular circle.

In the foregoing specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A device for indicating when any of a number of electrical quantities depart from normal values comprising a cathode ray tube having a face coated with fluorescent material; a circular line on a face of said tube with radial lines intersecting the circular line, each radial line being graduated to indicate the value of a measurement; means for directing a beam at said face; and means to deflect the beam in the form of a circular trace comprising means for producing a rotating field in the tube and additional means for modifying the field so that when all of the electrical quantities to be indicated are at normal values a circular trace along said circular line results on the face of the tube and when any one of the quantities departs from normal the trace will depart from circular at the point thereon representative of the quantity that departed from normal, said additional means including a plurality of beam deflecting elements, one for each of said quantities, each of which elements being energized separately and independently from the other elements by its complementary quantity.

2. An electrical instrument comprising a cathode ray tube having beam producing means, a circular metallic element generally perpendicular to the path of the beam, a plurality of deflection plates spaced from and located around the periphery of said element, separate leads respectively extending from said plates through the tube, beam deflection means for causing the beam to traverse a circular path that passes between the element and said plates and radial graduated lines on the face of the cathode ray tube, one such line complementary to each said plate, for indicating the electrical potential on the plate.

3. A cathode ray tube system comprising an envelope having beam producing means at one end thereof and a fluorescent screen at the other, said envelope including a side wall interconnecting said ends, beam deflecting means located between the beam producing means and the screen, a mirror located in the envelope for reflecting through the side wall of the envelope any image appearing on the inside wall of said other end, said mirror being located between the beam deflecting means and the screen, and means for energizing the beam deflecting means to deflect the beam recurrently around the mirror to form a trace on the screen in the shape of a closed loop.

4. A cathode ray tube comprising an envelope having beam producing means at one end thereof and a fluorescent screen at the other end thereof, said envelope including a side wall interconnecting said ends, means which may be so energized as to so deflect the beam that it will form a trace on the screen in the shape of a closed loop, beam deflecting means adjacent the path of the beam when it is tracing such a closed loop comprising a central metallic part and a plurality of spaced metallic elements located between the central part and said side wall and respectively at different angular positions around the central metallic part, each said metallic element having a separate wire leading from it through the envelope, and a mirror located in the region of the envelope which is shaded from electron bombardment by reason of said central metallic part for reflecting through said side wall any image appearing on the inside of said other end of said envelope.

5. A cathode ray tube as defined in claim 4 including a lens in said side wall so positioned that the reflected image passes therethrough.

6. A measuring instrument comprising a cathode ray tube having a screen and means for directing a beam of electrons at said screen, means including a source of polyphase current for rotating said beam to form a normally circular trace, circularly disposed indicia on the face of the tube to act as a standard of comparison and enable visual determination of the departure of said trace from a true circle, a conical metallic member having its axis intersecting the center of the normally circular trace and perpendicular to the plane of the trace, said conical metallic member being positioned between the first-named means and the screen with the larger end nearest the screen, the outer surface of the conical metallic member having an angle of inclination with reference to its axis substantially equal to the angle of inclination of the beam with reference to said axis whereby the beam may recurrently pass around and generally concentric to the surface of the conical metallic member, a plurality of deflecting elements located between the conical member and the inner side wall of the tube and having different angular positions around the conical member, means for separately applying different potentials to the different deflecting elements including a wire located outside the tube for each deflecting element for respectively energizing the same, shields between said deflecting elements, and means for interconnecting the shields and the conical metallic member.

7. In combination, a cathode ray tube comprising an envelope having beam producing means at one end thereof and a fluorescent screen at the other end thereof, means adjacent the beam producing means for deflecting the beam and means for reciproducing at a remote location the image appearing on the inside of said other end of said envelope, said last-named means having its pickup means outside the path of view to the outside of said other end of said envelope, whereby said reproducing means does not interfere with the normal viewing of the fluorescent screen of the cathode ray tube.

8. The method of indicating the departure from a predetermined value of any one of a number of variable electrical quantities of unknown magnitude comprising establishing a rotating beam of electrons and producing a visible trace thereby, controlling the positions where the beam intersects various radii of the trace according to the several electrical quantities respectively so that when each electrical quantity is at a value predetermined for it the trace will be a circle and when a quantity departs from its predetermined value the trace departs from a true circle along the radii complementary to that quantity.

9. The method of making electrical measurements of a number of variables of unknown magnitude comprising rotating a beam of electrons, visibly indicating the trace of said beam, controlling the positions of the beam along different radii of the trace respectively according to said variables respectively, each variable having a normal value and when it is at its normal value the positions where the trace intersects the radii are points on a circle whereby the trace is circular, any departure of any value from normal resulting in a departure of the trace from a circle along the radius of the trace complementary to the particular variable which has departed from normal.

References Cited in the file of this patent

UNITED STATES PATENTS

| 1,514,123 | Bacevicy | Nov. 4, 1924 |
| 2,128,632 | Eaton | Aug. 30, 1938 |

(Other references on following page)

UNITED STATES PATENTS

| | | | |
|---|---|---|---|
| 2,154,127 | Hollmann | Apr. 11, | 1939 |
| 2,200,745 | Heymann | May 14, | 1940 |
| 2,394,196 | Morgan | Feb. 5, | 1946 |
| 2,412,350 | Morgan | Dec. 10, | 1946 |
| 2,414,444 | Busignies | Jan. 21, | 1947 |
| 2,426,439 | Dome | Aug. 26, | 1947 |
| 2,438,406 | Konet | Mar. 23, | 1948 |
| 2,447,233 | Chatterjea | Aug. 17, | 1948 |
| 2,449,093 | Weingarten | Sept. 14, | 1948 |
| 2,468,032 | Busignies | Apr. 26, | 1949 |
| 2,484,022 | Esval | Oct. 11, | 1949 |
| 2,547,638 | Gardner | Apr. 3, | 1951 |
| 2,578,939 | Moran | Dec. 18, | 1951 |

FOREIGN PATENTS

| | | | |
|---|---|---|---|
| 962,965 | France | Dec. 19, | 1949 |